US012145293B2

(12) United States Patent
Audinwood et al.

(10) Patent No.: US 12,145,293 B2
(45) Date of Patent: Nov. 19, 2024

(54) METHODS AND APPARATUS FOR MICROWAVE DRYING OF GREEN CERAMIC HONEYCOMB BODIES USING ADJUSTABLE AIR FLOW

(71) Applicant: CORNING INCORPORATED, Corning, NY (US)

(72) Inventors: Colby William Audinwood, Big Flats, NY (US); Brett Alan Terwilliger, Corning, NY (US)

(73) Assignee: Corning Incorporated, Corning, NY (US)

( * ) Notice: Subject to any disclaimer, the term of this patent is extended or adjusted under 35 U.S.C. 154(b) by 639 days.

(21) Appl. No.: 17/606,936

(22) PCT Filed: Apr. 23, 2020

(86) PCT No.: PCT/US2020/029438

§ 371 (c)(1),
(2) Date: Oct. 27, 2021

(87) PCT Pub. No.: WO2020/223091

PCT Pub. Date: Nov. 5, 2020

(65) Prior Publication Data

US 2022/0203575 A1 Jun. 30, 2022

Related U.S. Application Data

(60) Provisional application No. 62/840,873, filed on Apr. 30, 2019.

(51) Int. Cl.
*B28B 11/24* (2006.01)
*F26B 3/34* (2006.01)
(Continued)

(52) U.S. Cl.
CPC .......... *B28B 11/241* (2013.01); *B28B 11/243* (2013.01); *F26B 3/343* (2013.01);
(Continued)

(58) Field of Classification Search
CPC ... H05B 6/78; H05B 2206/046; B28B 11/241; B28B 11/243; F26B 3/343; F26B 3/347; F26B 15/14; F26B 21/022; F26B 2210/02
(Continued)

(56) References Cited

U.S. PATENT DOCUMENTS

| | | | |
|---|---|---|---|
| 4,045,639 | A | 8/1977 | Meisel |
| 5,388,345 | A | 2/1995 | Brundage et al. |

(Continued)

FOREIGN PATENT DOCUMENTS

| | | | |
|---|---|---|---|
| CN | 100376840 | C | 3/2008 |
| CN | 101650113 | A | 2/2010 |

(Continued)

OTHER PUBLICATIONS

International Search Report and Written Opinion of the International Searching Authority; PCT/US2020/029438; dated Aug. 27, 2020; 11 pages; European Patent Office.

*Primary Examiner* — Stephen M Gravini
(74) *Attorney, Agent, or Firm* — Kevin M. Able

(57) ABSTRACT

A method of drying a green ceramic honeycomb body (20) comprising: moving the body (20) through a drying system (50) comprising interconnected microwave devices (60), wherein each microwave device (D1, D2, D3) comprises an entrance (62*a*, 62*b*, 62*c*) located at an upstream end and an exit (64*a*, 64*b*, 64*c*) located at a downstream end of the microwave device (D1, D2, D3), the ends defining a downstream direction (72) and an upstream direction (74) in each of the devices (D1, D2, D3); removing moisture from the body (20) by irradiating the body (20) with microwave
(Continued)

radiation within each of the devices (D1, D2, D3); and flowing air against the outer peripheral wall (22) of the body (20) while the body (20) is located in each of the microwave devices (D1, D2, D3). The flowing is conducted such that one or more of a supply flow and an exhaust flow of air is adjusted in at least one of the devices (D1, D2, D3) such that the air flow in the system is at a predetermined magnitude substantially in the upstream (74) or downstream direction (72).

18 Claims, 6 Drawing Sheets

(51) Int. Cl.

| | |
|---|---|
| ***F26B 3/347*** | (2006.01) |
| ***F26B 15/14*** | (2006.01) |
| ***F26B 21/02*** | (2006.01) |
| ***H05B 6/78*** | (2006.01) |

(52) U.S. Cl.
CPC .............. *F26B 3/347* (2013.01); *F26B 15/14* (2013.01); *F26B 21/022* (2013.01); *H05B 6/78* (2013.01); *F26B 2210/02* (2013.01); *H05B 2206/046* (2013.01)

(58) Field of Classification Search
USPC ............................................................ 34/259
See application file for complete search history.

(56) References Cited

U.S. PATENT DOCUMENTS

| | | | | | |
|---|---|---|---|---|---|
| 5,406,058 | A | | 4/1995 | Lipp | |
| 5,694,701 | A | * | 12/1997 | Huelsman | G11B 5/842 34/421 |
| 5,830,548 | A | * | 11/1998 | Andersen | C04B 28/04 428/152 |
| 5,911,941 | A | | 6/1999 | Rokhvarger et al. | |
| 5,977,529 | A | | 11/1999 | Willert-Porada et al. | |
| 6,539,644 | B1 | | 4/2003 | Araya | |
| 6,725,567 | B2 | | 4/2004 | Yano et al. | |
| 6,932,932 | B2 | | 8/2005 | Miura et al. | |
| 7,425,692 | B2 | | 9/2008 | Orbeck et al. | |
| 8,075,829 | B2 | | 12/2011 | Takagi et al. | |
| 8,328,551 | B2 | | 12/2012 | Orbeck et al. | |
| 8,407,915 | B2 | * | 4/2013 | George | B28B 11/241 34/259 |
| 8,545,609 | B2 | * | 10/2013 | Caggiano | H05B 6/802 96/144 |
| 8,756,830 | B2 | * | 6/2014 | Priebe | B41J 11/00216 34/616 |
| 8,782,921 | B2 | * | 7/2014 | Armenta-Pitsakis | F26B 3/347 219/699 |
| 8,826,558 | B2 | * | 9/2014 | Priebe | F26B 3/22 430/62 |
| 8,904,667 | B2 | * | 12/2014 | Sauerbeck | B01J 20/28042 34/409 |
| 9,188,387 | B2 | | 11/2015 | Audinwood et al. | |
| 9,435,585 | B2 | | 9/2016 | Lam | |
| 10,464,131 | B2 | * | 11/2019 | Mark | B22F 1/10 |
| 10,828,698 | B2 | * | 11/2020 | Mark | B22F 3/1025 |
| 11,220,021 | B2 | * | 1/2022 | Malarkey | B30B 11/24 |
| 2002/0093123 | A1 | | 7/2002 | Miura et al. | |
| 2002/0109269 | A1 | | 8/2002 | Miura et al. | |
| 2006/0042116 | A1 | | 3/2006 | Terazawa et al. | |
| 2008/0023886 | A1 | | 1/2008 | Adrian et al. | |
| 2009/0166910 | A1 | * | 7/2009 | Marshall | B01D 46/0001 264/46.1 |
| 2009/0206500 | A1 | | 8/2009 | Maguire et al. | |
| 2012/0001358 | A1 | | 1/2012 | Clark et al. | |
| 2014/0327186 | A1 | | 11/2014 | Cutler et al. | |
| 2016/0288364 | A1 | | 10/2016 | Kato et al. | |
| 2022/0203575 | A1 | * | 6/2022 | Audinwood | F26B 15/14 |

FOREIGN PATENT DOCUMENTS

| | | | | | |
|---|---|---|---|---|---|
| CN | 102792114 | A | | 11/2012 | |
| CN | 103017505 | B | | 5/2015 | |
| CN | 106830955 | A | | 6/2017 | |
| DE | 102005049533 | B3 | | 1/2007 | |
| JP | 2002-283329 | A | | 10/2002 | |
| JP | 2002-283330 | A | | 10/2002 | |
| JP | 2002-283331 | A | | 10/2002 | |
| JP | 2005-131800 | A | | 5/2005 | |
| JP | 2008-110569 | A | | 5/2008 | |
| JP | 2013-180412 | A | | 9/2013 | |
| WO | 2017/186857 | A1 | | 11/2017 | |
| WO | WO-2020223091 | A1 | * | 11/2020 | B28B 11/241 |

* cited by examiner

METHODS AND APPARATUS FOR MICROWAVE DRYING OF GREEN CERAMIC HONEYCOMB BODIES USING ADJUSTABLE AIR FLOW

This is a national stage application under 35 U.S.C. § 371 of International Application No. PCT/US2020/029438, filed on Apr. 23, 2020, which claims the benefit of priority under 35 U.S.C. § 119 of U.S. Provisional Application No. 62/840,873 filed on Apr. 30, 2019, the content of which is incorporated herein by reference in its entirety.

FIELD OF THE DISCLOSURE

The disclosure relates generally to extruded ceramic honeycomb bodies, and in particular relates to methods and apparatus for microwave drying of extruded green ceramic honeycomb bodies.

BACKGROUND

The process of forming a ceramic honeycomb structure (e.g., an automotive filter) typically involves forming an extrudate having a select or desired shape. The extrudate is wet and is referred to as a "honeycomb log", "honeycomb body", "green body" or the like. Once extruded, it is difficult to change the shape of the body in a controlled way. However, differences between a desired extrudate shape and the actual extrudate shape can occur from the processes used to form the extrudate. Further, such differences can also occur from the processes used to dry the green honeycomb body (e.g., as sectioned from an extrudate) before firing. Ultimately, these differences between a desired and an actual shape of the extrudate or green body can cause the green body to not meet its shape requirements or specification before or after firing, which necessitates that the green body be discarded. As honeycomb green bodies are discarded based on failures to meet shape requirements, production costs of the final ceramic honeycomb structures increase.

Accordingly, there is a need for improved methods and apparatus to correct or minimize the development of such shape imperfections when processing the green bodies so that the final ceramic honeycomb structures meet their shape specifications, and production costs are minimized.

SUMMARY OF THE DISCLOSURE

According to some aspects of the present disclosure, a method of drying a green ceramic honeycomb body comprising a matrix of walls extending parallel to a longitudinal axis and defining a plurality of longitudinal channels, the matrix being surrounded by an outer peripheral wall is provided. The method comprises: moving the honeycomb body through a drying system comprising a plurality of interconnected microwave devices in a travel path such that the longitudinal axis of the body is non-parallel to the travel path inside the microwave devices, wherein each microwave device comprises an entrance located at an upstream end of the device and an exit located at a downstream end of the microwave device, the upstream and downstream ends of the devices defining a downstream direction and an upstream direction in each of the devices and the system; removing moisture from the honeycomb body by irradiating the honeycomb body with microwave radiation within each of the microwave devices; and flowing air against the outer peripheral wall of the honeycomb body while the honeycomb body is located in each of the microwave devices. The flowing is conducted such that one or more of a supply flow and an exhaust flow of air is adjusted in at least one of the microwave devices such that the air flow in the system is at a predetermined magnitude substantially in the upstream direction or the downstream direction.

According to some aspects of the present disclosure, a method of drying a green ceramic honeycomb body comprising a matrix of walls extending parallel to a longitudinal axis and defining a plurality of longitudinal channels, the matrix being surrounded by an outer peripheral wall is provided. The method comprises: moving the honeycomb body through a drying system comprising a plurality of interconnected microwave devices in a travel path such that the longitudinal axis of the body is non-parallel to the travel path inside the microwave devices, wherein each microwave device comprises an entrance located at an upstream end of the device and an exit located at a downstream end of the microwave device, the upstream and downstream ends of the devices defining a downstream direction and an upstream direction in each of the devices and the system; removing moisture from the honeycomb body by irradiating the honeycomb body with microwave radiation within each of the microwave devices; and flowing air against the outer peripheral wall of the honeycomb body while the honeycomb body is located in each of the microwave devices. The shape of the peripheral wall of the honeycomb body comprises one or more of a slide component and a slump component. Further, the flowing is conducted such that one or more of a supply flow and an exhaust flow of air is adjusted in at least one of the microwave devices such that the air flow in the system is at a predetermined magnitude substantially in the upstream direction or the downstream direction.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

Figure 1:
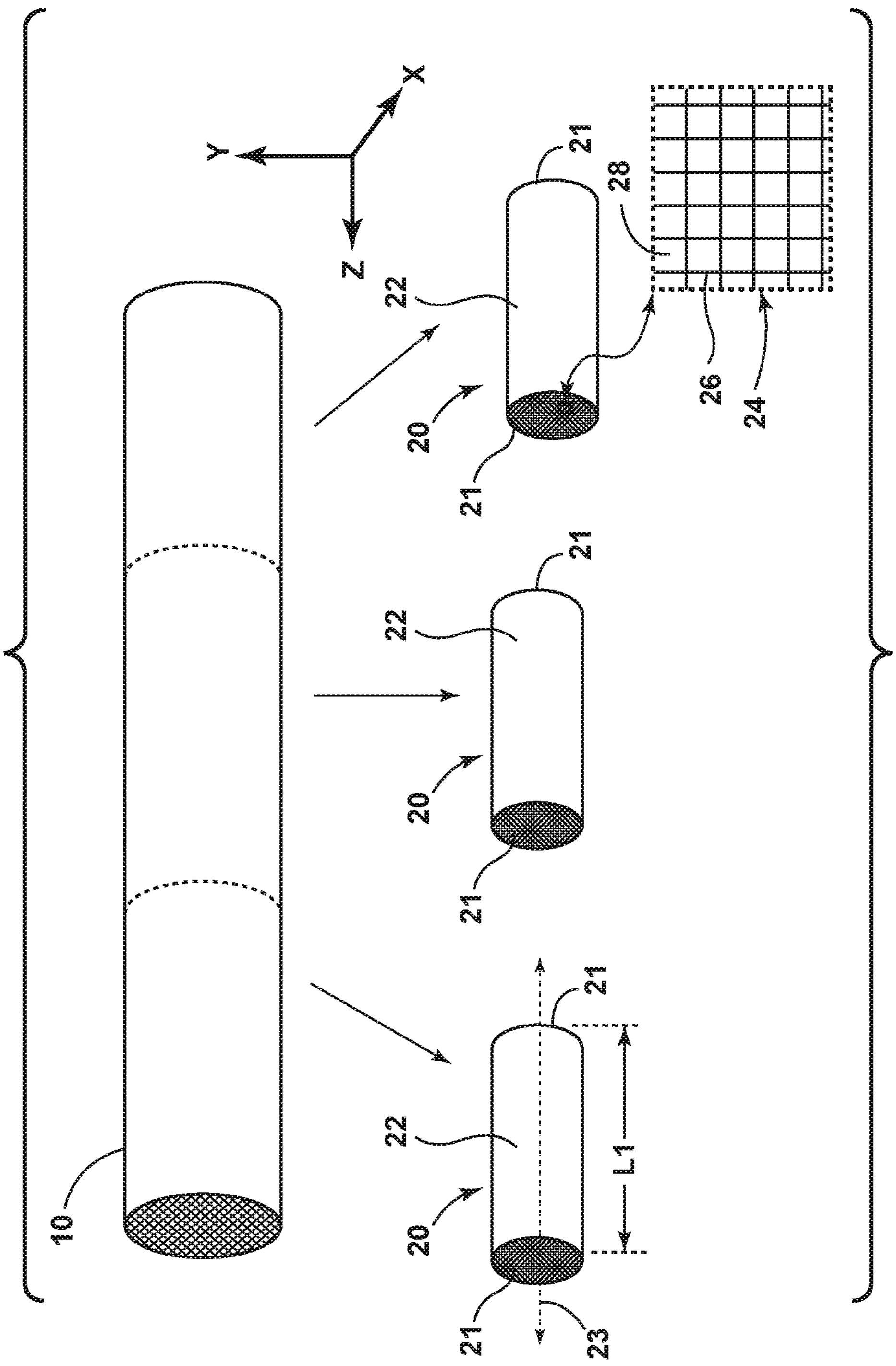
FIG. 1 is an elevated view of an idealized ceramic extrudate that is cut into green honeycomb bodies.

The foregoing summary, as well as the following detailed description of certain inventive techniques, will be better understood when read in conjunction with the figures. It should be understood that the claims are not limited to the arrangements and instrumentalities shown in the figures. Furthermore, the appearance shown in the figures is one of many ornamental appearances that can be employed to achieve the stated functions of the apparatus.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Unless otherwise noted, the terms "substantial," "substantially," and variations thereof as used herein are intended to note that a described feature is equal or approximately equal to a value or description. Moreover, "substantially" is intended to denote that two values are equal or approximately equal. In some embodiments, "substantially" may denote values within about 10% of each other, such as within about 5% of each other, or within about 2% of each other. In addition, the term "substantially" as used in the context of an air flow direction (e.g., upstream or downstream) and its magnitude (e.g., an air flow rate in units of "cfm") refers to the average air flow within the given microwave drying system, as measured at various points in the system while recognizing that local air flows (e.g., at a particular location within a particular microwave device) may differ in magnitude and/or direction from the overall air flow in the system.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring now to FIG. 1, an elevated view of an idealized ceramic extrudate 10 is provided. In FIG. 1, the extrudate 10 is cut into green ceramic bodies 20 (also referred herein as "logs" or "green bodies"). The bodies 20 have opposite ends 21 and an axial length, L1, that may be from about 1 inch to 5 feet, about 2 inches to 5 feet, or about 0.5 feet to 5 feet, as non-limiting examples. The bodies 20 can have any reasonable cross-sectional shape, with circular and oval cross-sectional shapes being two exemplary shapes often employed, e.g., as dependent on the end use application of the body 20, as-fired. The bodies 20 have an outer peripheral wall 22 and a body portion 24. The body portion 24 is made up of a matrix of thin walls 26 that extend parallel to a longitudinal axis 23 of the body 20 and define a plurality of longitudinal channels 28. Further, the green ceramic body 20 is depicted in an exemplary form in FIG. 1 as a honeycomb structure, but may take on other structures, typically for end uses that include gas and liquid filtration.

Example materials for the logs 20 depicted in FIG. 1 include cordierite, silicon carbide (SiC), and aluminum titanate (AT). The shape control systems and methods disclosed herein apply to any type of ceramic-based log amenable to radio-frequency or microwave-frequency drying techniques and principles. Examples of such drying techniques are outlined in U.S. Pat. Nos. 3,953,703, 4,771,153, 6,259,078, and 8,020,314; and the salient portions of which that are related to such drying techniques are hereby incorporated by reference in this disclosure.

Figure 2:
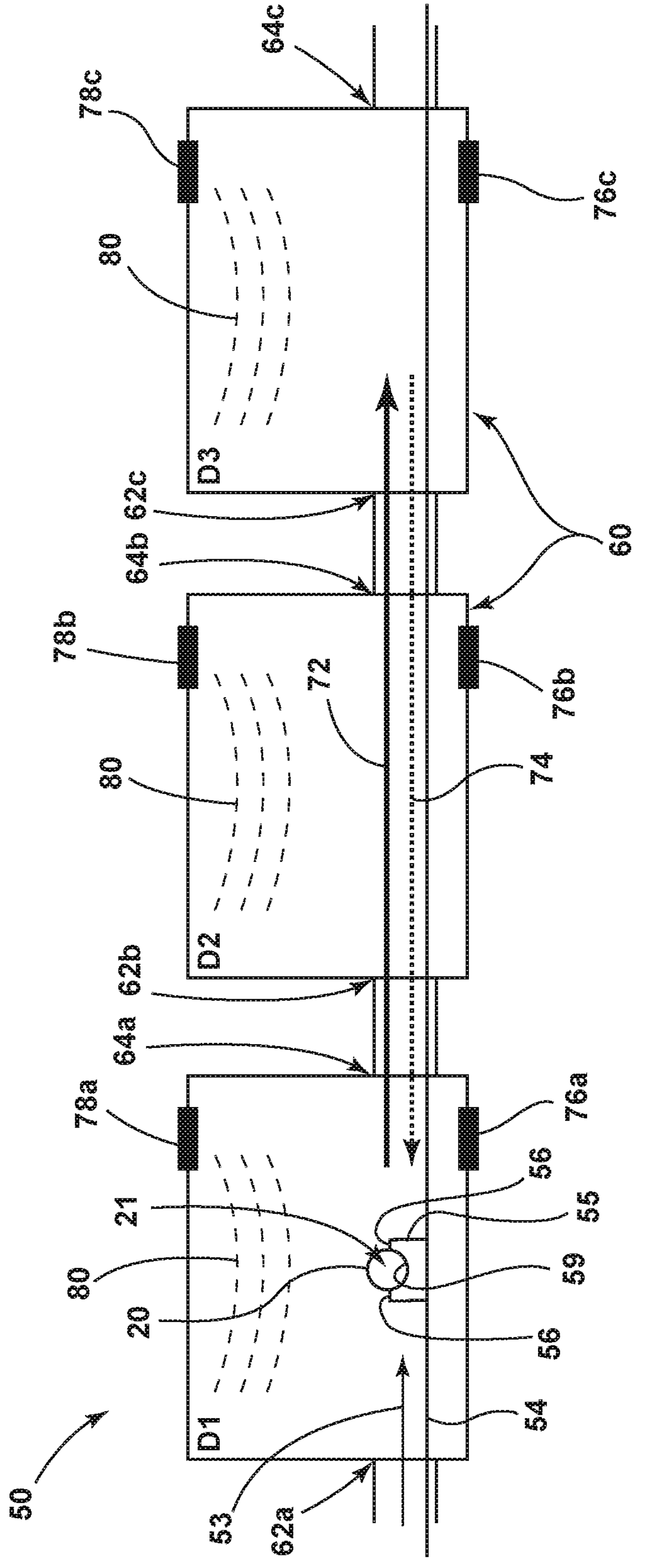
FIG. 2 is a schematic diagram of an example microwave drying system, according to embodiments of the disclosure.

Referring now to FIG. 2, a schematic diagram of a microwave drying system 50 is provided, according to an embodiment of the disclosure. The drying system 50 includes a conveyor 54 that supports green ceramic bodies 20. The bodies 20 are each supported in a corresponding tray 55 or carrier. According to some embodiments of the system 50, the tray 55 is fabricated from a ceramic composition. In some implementations, the tray 55 includes flat upper side portions 56 that run the length of the tray 55 on either side of a central recess 59. The central recess 59 can be rounded, for example, and generally conform to the shape of the bodies 20, particularly the shape of its outer peripheral wall 22. As also shown in FIG. 2, the tray 55 and central recess 59 are configured to support the bodies 20 along their longitudinal axis 23 (see FIG. 1) such that the ends 21 and a substantial portion of the outer peripheral wall 22 (see FIG. 1) of the bodies 20 are exposed. In some implementations of the drying system 50, the surface area of the recess 59 can be adjusted to allow for direct exposure of air within the system 50 to a greater or lesser percentage of the outer peripheral wall 22, as compared to the recess 59 depicted in FIG. 2. As such, various configurations of the tray 55, including the geometry of the central recess 59, are contemplated by the disclosure.

Referring again to FIG. 2, the microwave drying system 50 includes a plurality of interconnected microwave devices 60. With regard to the drying system 50 shown in exemplary form in FIG. 2, the plurality of microwave devices 60 includes three interconnected microwave devices, D1, D2, and D3, as arranged in series. In other implementations, the plurality of microwave devices 60 can include any number of interconnected microwave devices (e.g., D1, D2, D3, D4, D5, etc.). As shown in FIG. 2, the D1 device is upstream of the D2 and D3 devices, with D3 being downstream of the D1 and D2 devices. Each of these devices, D1, D2, and D3, includes an upstream entrance 62*a*, 62*b* and 62*c*, respectively. Further, each of the devices, D1, D2, and D3, includes a downstream exit 64*a*, 64*b*, and 64*c*, respectively.

As shown in FIG. 2, the ceramic green body 20, as residing on the tray 55 and conveyor 54, moves along the travel path 53. More particularly, the body 20 moves along the travel path 53 through the entrance 62*a* and out of the exit 64*a* of the D1 device; through the entrance 62*b* and out of the exit 64*b* of the D2 device; and through the entrance 62*c* and out of the exit 64*c* of the D3 device. As the ceramic green body 20 proceeds along the travel path 53 through each of the D1, D2, and D3 microwave devices, the body 20 is subjected to microwave radiation 80 to remove moisture from the body 20. As the green body 20 moves through each of the microwave devices D1, D2 and D3, air along the upstream direction 74 or air along the downstream direction 72 within the system 50 is directed against the outer peripheral wall 22 of the body 20. Further, air flow within the system 50 can be adjusted to be substantially in the upstream direction 74 or downstream direction 72 by controlling or otherwise adjusting one or more of the supply air flow elements 76*a*, 76*b* and 76*c* and exhaust baffles 78*a*, 78*b* and 78*c* located in the microwave devices D1, D2 and D3, respectively. In addition, the magnitude of the air flowing in the downstream direction 72 or upstream direction 74 within the system 50 can be increased or decreased by adjustments to one or more of the supply air flow elements 76*a*, 76*b* and 76*c* and exhaust baffles 78*a*, 78*b* and 78*c* located in the microwave devices D1, D2 and D3, respectively. As would be understood by those skilled in the field of the disclosure, the magnitude and direction of air flow within the system 50 (i.e., in the upstream and downstream directions 72, 74) can be measured by one or more air flow sensors located at particular locations in the air flow path within the system depicted in FIG. 2 (e.g., at or above the entrance 62*a* of the D1 device).

As depicted in FIG. 2 in exemplary form, the microwave drying system 50 is configured such that the supply flow elements 76*a*, 76*b* and 76*c* and the exhaust baffles 78*a*, 78*b* and 78*c* are located downstream of the midpoint of each of the devices D1, D2 and D3. According to some embodiments, the supply flow elements 76*a*, 76*b* and 76*c* and the exhaust baffles 78*a*, 78*b* and 78*c* are located at other positions within the devices D1, D2 and D3. In further implementations of the system 50, additional supply flow elements and/or exhaust baffles are located within the devices D1, D2 and D3 besides the supply flow elements 76*a*, 76*b* and 76*c* and the exhaust baffles 78*a*, 78*b* and 78*c* depicted in FIG. 2.

With further regard to the microwave drying system 50 shown in FIG. 2, the application of microwave radiation 80 and air in the downstream direction 72 or upstream direction 74 can be conducted to, and directed against, the ceramic green body 20 until it is substantially dry. In an example, "dry" means that most or all of the liquid initially present in the extrudate 10 has been removed so that the moisture content has been reduced to a level acceptable for cutting and firing the piece at a high temperature, e.g., according to firing temperatures and times sufficient to fire the body 20, as would be understood by those of ordinary skill within the field of this disclosure. In some implementations, the ceramic green bodies 20 have a drying target upon exiting the drying system 50. In some embodiments, the drying target is 90% dry, i.e., 10 wt. % water, and in some cases the drying target is higher, e.g., as containing less than 2 wt. % water or even in some cases less than 1 wt. % water. Having the proper moisture content at this stage of processing the green bodies 20 into final ceramic structures (e.g., honeycomb filters) can be critical because the bodies 20 that are too moist may become damaged upon cutting (e.g., are subject to "smearing"), and can also damage the cutting saw. Thus, green bodies 20 generally need to be sufficiently dry to avoid being damaged upon cutting prior to firing. Further, according to some implementations of the microwave drying system 50, the drying target is about 80% to 85%, and additional hot air dryers after the last microwave device D3 can be employed to further dry the bodies 20 (not shown in FIG. 2).

As discussed above, extrudate 10 and ceramic green bodies 20 formed from the extrudate 10 are wet. Differences between a desired cross-sectional shape and the actual cross-sectional shape can and do occur from the processes used to form the extrudate 10 and the initial ceramic green bodies 20 (see FIG. 1). However, once extruded, it has been difficult to change the shape of green bodies in a controlled way in subsequent, conventional drying processes. Further, conventional drying processes have also resulted in undesired and uncontrolled changes in the cross-sectional shape of ceramic green bodies.

Figure 3A:
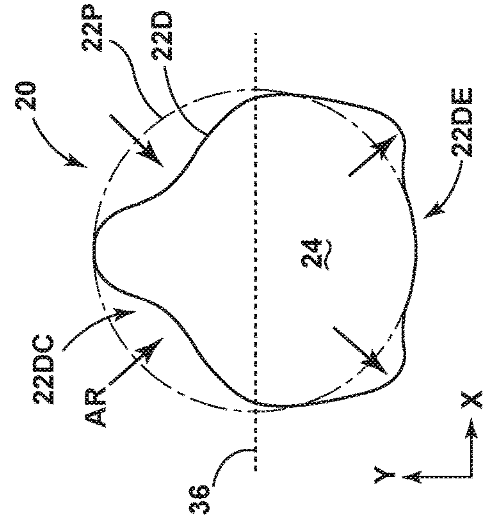
FIGS. 3A-3D are cross-sectional views of a honeycomb body as taken in the X-Y plane and that show an ideal cross-sectional shape in phantom along with example cross-sectional shape deformations that can arise in practice.
Figure 3B:
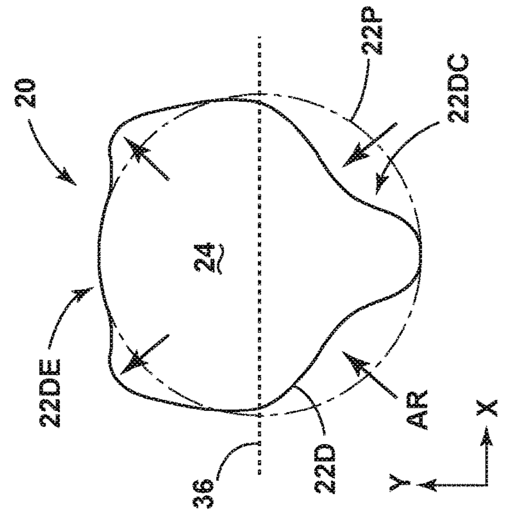
Figure 3C:
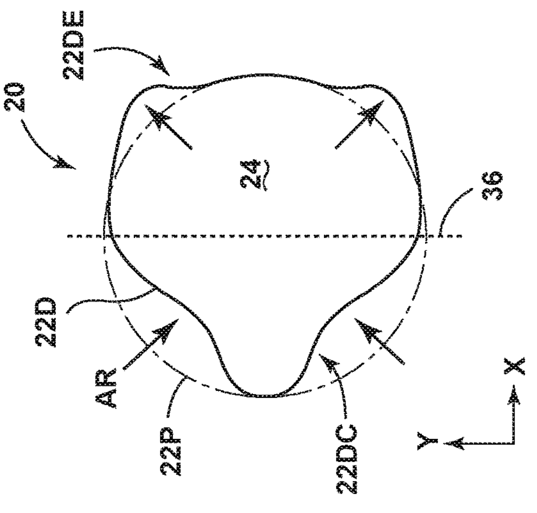
Figure 3D:
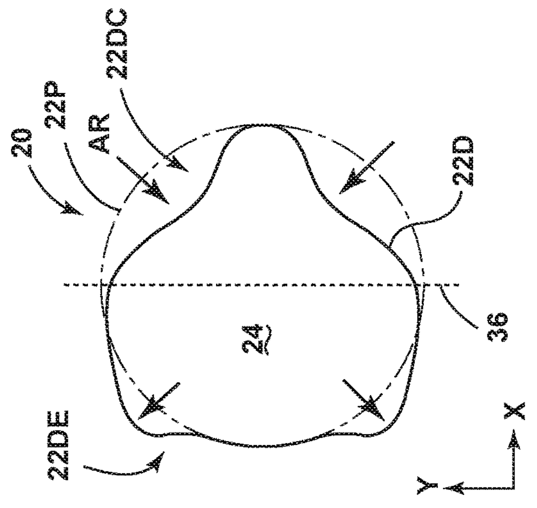

FIGS. 3A through 3D are cross-sectional views of ceramic green bodies 20 as taken in the X-Y plane and that show an ideal cross-sectional shape in phantom along with example cross-sectional shape deformations of green body 20 (or, more specifically, of green body portion 24) that can arise in practice. FIG. 3A and FIG. 3B illustrate example deformations called "positive slump" and "negative slump", respectively (also referred to as "positive slump component" and "negative slump component"). Further, FIG. 3C and FIG. 3D illustrate example deformations called "negative slide" and "positive slide," respectively (also referred to as "negative slide component" and "positive slump component"). Arrows AR indicate the direction in which the outer peripheral wall 22 has moved, passing from an "ideal" or "perfect" surface 22P to a deformed surface 22D. It should be understood, however, that movement of the outer wall 22 (e.g., as shown by arrows AR in FIGS. 3A-3D) includes internal rearrangements and movement of material within the green body 20 and the green body portion 24. A dashed line 36 represents the dividing line between where deformed surface shape 22D has contracted relative to ideal surface shape 22P and where the deformed surface has expanded relative to the ideal surface. The portion of the outer peripheral wall 22 that has contracted relative to the ideal surface shape 22P is referred to herein as contracted surface portion 22DC. Likewise, the portion of the outer peripheral wall 22 that has expanded relative to the ideal surface shape 22P is referred to herein as expanded surface portion 22DE.

Referring again to FIGS. 3A-3D, the ceramic green bodies 20 that are sectioned, cut or otherwise formed from the extrudate 10 (see FIG. 1) can exhibit various degrees of slump and/or slide components prior to initiation of a drying process, such as employed within the microwave drying system 50 (see FIG. 2). In some embodiments, the green bodies 20, as sectioned from the extrudate 10, are characterized by a positive slump component, as depicted in FIG. 3A. In some embodiments, the green bodies 20, as sectioned from the extrudate 10, are characterized by a negative slide component or a positive slide component, as depicted in FIG. 3C and FIG. 3D, respectively. In other embodiments, the green bodies 20, as sectioned from the extrudate 10, are characterized by no appreciable slump and slide components; consequently, their outer peripheral walls 22 have a shape consistent with the ideal surface shape 22P (e.g., as shown in FIGS. 3A-3D).

An aspect of the disclosure involves adjusting the shape of the ceramic green bodies 20 as the bodies 20 are being dried in a microwave drying system, such as the microwave drying system 50 depicted in FIG. 2, by changing the moisture and/or drying differential in these bodies 20 through the manipulation of the air flow within the system 50. The air flow direction can be adjusted to be a predominantly downstream direction 72 or a predominantly upstream direction 74. Further, the magnitude of the air flowing in the downstream direction 72 or the upstream direction 74 can also be manipulated. These adjustments can be made within the system 50 to preferentially heat or otherwise dry portions of the peripheral wall 22 to drive shape changes to the body 20 (e.g., the magnitude of the slump and/or slide components shown in FIGS. 3A-3D).

Accordingly, aspects of the disclosure are directed to situations where the outer peripheral wall 22 of the body 20 is initially deformed (e.g., with one or more of a slump or slide component as shown in FIGS. 3A-3D). In these aspects, the drying of the body 20 within the drying system 50, according to the methods outlined in the disclosure, causes the outer peripheral wall 22 of the body to more closely approach the ideal surface shape 22P. That is, the drying of the body 20 within the system 50 can be employed to remove or otherwise minimize slide and/or slump component defects that are initially present in the body 20 after extrusion and sectioning from the extrudate 10 (see FIG. 1).

In other aspects of the disclosure, the outer peripheral wall 22 of the ceramic green body 20 has an initial shape that is within a tolerance as compared to an ideal surface shape 22P (see FIGS. 3A-3D). In these aspects, the microwave drying of the ceramic green body 20 with a microwave drying system 50 (see FIG. 2), according to the methods of the disclosure, causes the outer peripheral wall 22 to stay within the tolerance, as compared to not using the methods and having the ceramic green body 20 fall outside the tolerance by virtue of the inherent non-uniformities of a conventional microwave drying process. That is, the drying of the body 20 within the system 50 can be employed to preserve the lack of any appreciable slide and/or slump components in the body 20 after extrusion and sectioning from the extrudate 10 (see FIG. 1).

Figure 4:
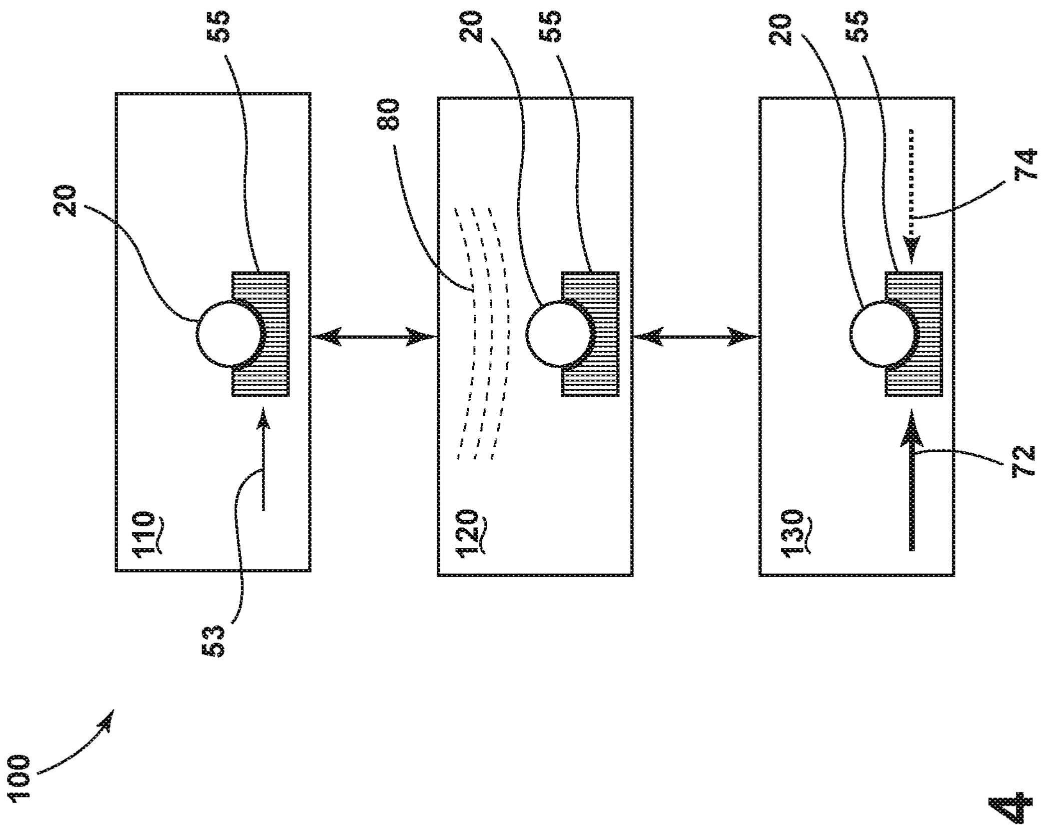
FIG. 4 is a schematic flow chart of a method of drying a green ceramic honeycomb body, according to embodiments of the disclosure.

Referring now to FIG. 4, a schematic flow chart is provided of a method 100 of drying a green ceramic honeycomb body, such as a ceramic body 20 (see FIG. 1). FIG. 4, in particular, depicts a method 100 of drying a green ceramic honeycomb body 20 comprising a matrix of walls 26 extending parallel to a longitudinal axis 23 and defining a plurality of longitudinal channels 28, the matrix of walls 26 being surrounded by an outer peripheral wall 22 (see FIG. 1). In some implementations of the method 100, the outer peripheral wall 22 of the body 20 includes one or more slump or slide components (e.g., as shown in FIGS. 3A-3D). In other implementations of the method 100, the outer peripheral wall 22 of the body 20 does not include any appreciable slump or slide components.

Referring again to FIG. 4, the method 100 includes a step 110 of moving the honeycomb body 20 through a microwave drying system 50 comprising a plurality of interconnected microwave devices 60 (see FIG. 2) in a travel path 53 such that the longitudinal axis 23 of the body 20 is non-parallel to the travel path 53 inside the microwave devices 60 (e.g., devices D1, D2 and D3 shown in FIG. 2). Further, each microwave device (e.g., D1, D2 and D3) comprises an entrance (e.g., entrances 62*a*, 62*b*, and 62*c*) located at an upstream end of the device and an exit (e.g., exits 64*a*, 64*b*, 64*c*) located at a downstream end of the microwave device, the upstream and downstream ends of the devices (i.e., the entrances 62*a-c* and exits 64*a-c*) defining a downstream direction and an upstream direction in each of the devices and the system 50 (e.g., downstream direction 72 and upstream direction 74, as shown in FIG. 2). In some implementations of the method 100, the honeycomb body 20 is moved according to step 110 at a constant speed along the travel path 53 through each of the plurality of microwave devices 60. In other implementations of the method 100, the honeycomb body 20 is moved according to step 110 at various speeds and/or paused along the travel path 53 as the body 20 progresses through each of the plurality of microwave devices 60.

Referring again to FIG. 4, the method 100 of drying a green honeycomb body 20 includes a step 120 of removing moisture from the honeycomb body 20 by irradiating the honeycomb body with microwave radiation 80 within each of the plurality of microwave devices 60. As noted earlier, the step 120 can be conducted with radio-frequency and/or microwave-frequency drying techniques to impart the microwave radiation 80 upon the honeycomb body 20. In some implementations of the method 100, the step 120 is conducted such that radiation 80 is imparted for the duration in which the ceramic body 20 resides within each of the plurality of microwave devices 60. In other implementations of the method 100, the step 120 is conducted such that the radiation 80 is imparted for a portion of the duration in which the ceramic body is located within each of the plurality of microwave devices 60 (e.g., devices D1, D2 and D3 shown in FIG. 2).

Still referring to FIG. 4, the method 100 of drying a green body 20 also includes a step 130 of flowing air against the outer peripheral wall 22 of the honeycomb body 20 while the honeycomb body is located in each of the plurality of microwave devices 60. The step 130 of flowing air is conducted such that one or more of a supply flow (e.g., from the supply flow elements 76*a*, 76*b*, and 76*c* shown in FIG. 2) and an exhaust flow (e.g., from the exhaust baffles 78*a*, 78*b*, and 78*c*, as shown in FIG. 2) of air is adjusted in at least one of the plurality of microwave devices 60 (e.g., in devices D1, D2 and D3) such that the air flow in the system is at a predetermined magnitude substantially in the upstream direction 74 or the downstream direction 72.

According to an embodiment of the method 100 depicted in FIG. 4, step 130 can be conducted to change the shape of the outer peripheral wall 22 of the body 20 within at least one of the plurality of microwave devices 60. Further, the step 130 of flowing air can be conducted such that one or more of a supply flow or exhaust flow of air is adjusted in one of the microwave devices 60 (e.g., in the D3 device) to change a shape of the outer peripheral wall 22 of the body 20 while the body 20 resides in another of the microwave devices 60 (e.g., in the D2 device). In some implementations of the method 100 in which the ceramic green body 20 has an outer peripheral wall 22 with one or more of a slump or slide component (see FIGS. 3A-3D), step 130 can be conducted to reduce or otherwise change the one or more of a slump or slide component associated with the body 20 and its outer peripheral wall 22 within at least one of the plurality of microwave devices 60. In addition, the step 130 of flowing air can be conducted such that one or more of a supply flow or exhaust flow of air is adjusted in one of the microwave devices 60 (e.g., in the D3 device) to reduce or otherwise change the one or more of a slump or slide component associated with the outer peripheral wall 22 while the body 20 resides in another of the microwave devices 60 (e.g., in the D2 device).

As is also evident from FIG. 4, each of the steps 110, 120 and 130 of the method 100 of drying a green body 20 can be conducted sequentially within each of the plurality of microwave devices 60. For example, steps 110, 120 and 130 of the method 100 can be conducted sequentially within each of the devices D1, D2 and D3. In another implementation of the method 100, the step 130 of flowing air against the outer peripheral wall 22 of the body 20 is conducted continuously and steps 110 and 120 are conducted sequentially within each of the microwave devices D1, D2 and D3. According to this implementation of the method 100, the ceramic body 20 is continuously subjected to a step 130 of flowing air against the outer peripheral wall 22 of the body 20 within each of the plurality of devices 60. Further, the body 20 is moved according to step 110 into one of the plurality of microwave devices 60 (e.g., device D1) along the travel path 53, and then subjected to the step 120 of removing moisture from the body 20 through the application of microwave radiation within the same microwave device. At this point, the body 20 is then moved again according to step 110 into the next of the microwave devices 60 (e.g., device D2), and then subjected to the step 120 of removing moisture from the body 20, and so on.

Figure 5A:
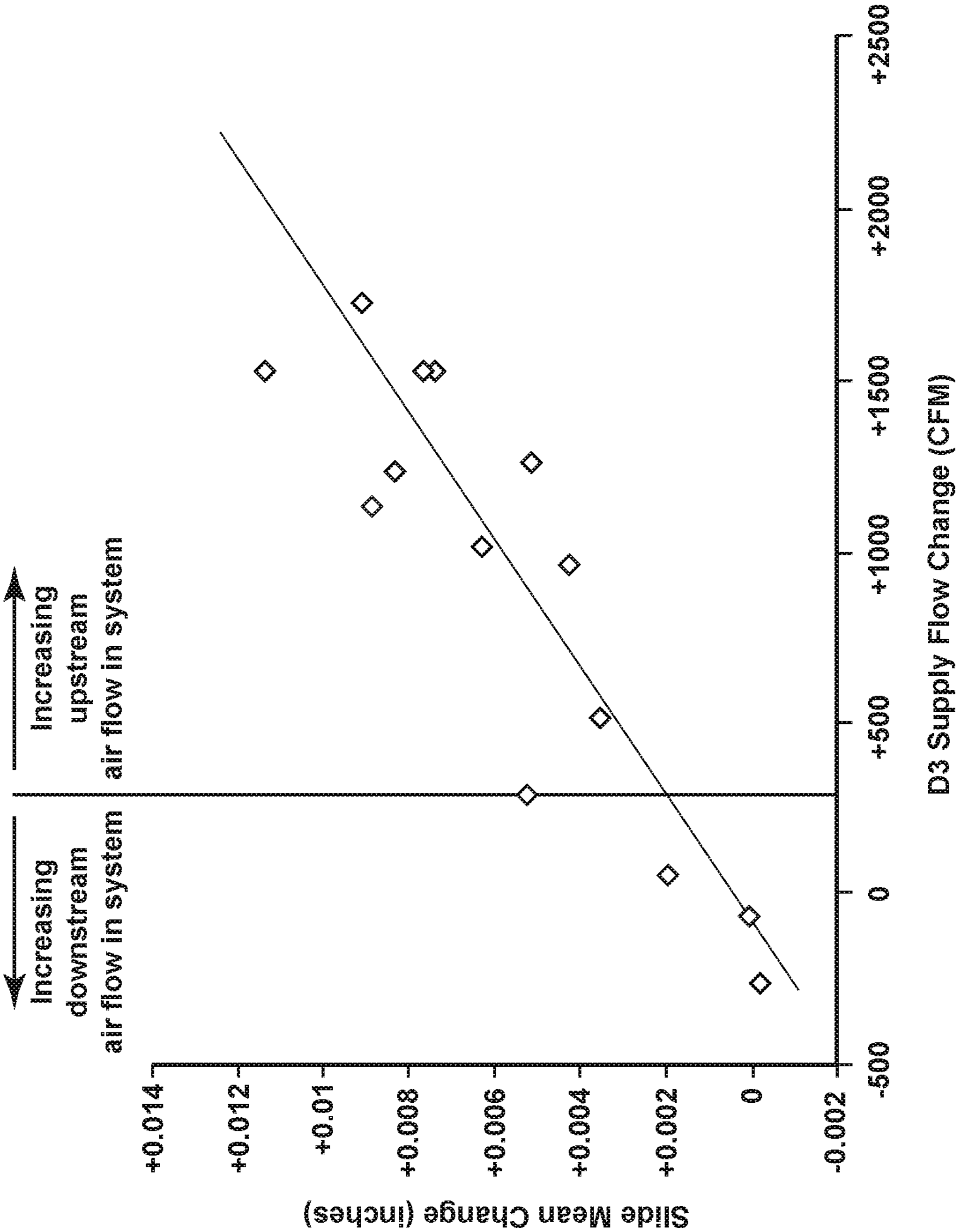
FIG. 5A is a plot of the mean change in the slide component of green ceramic honeycomb bodies as a function of supply air flow change in the last microwave device of a microwave drying system, as dried according to methods of the disclosure.
Figure 5B:
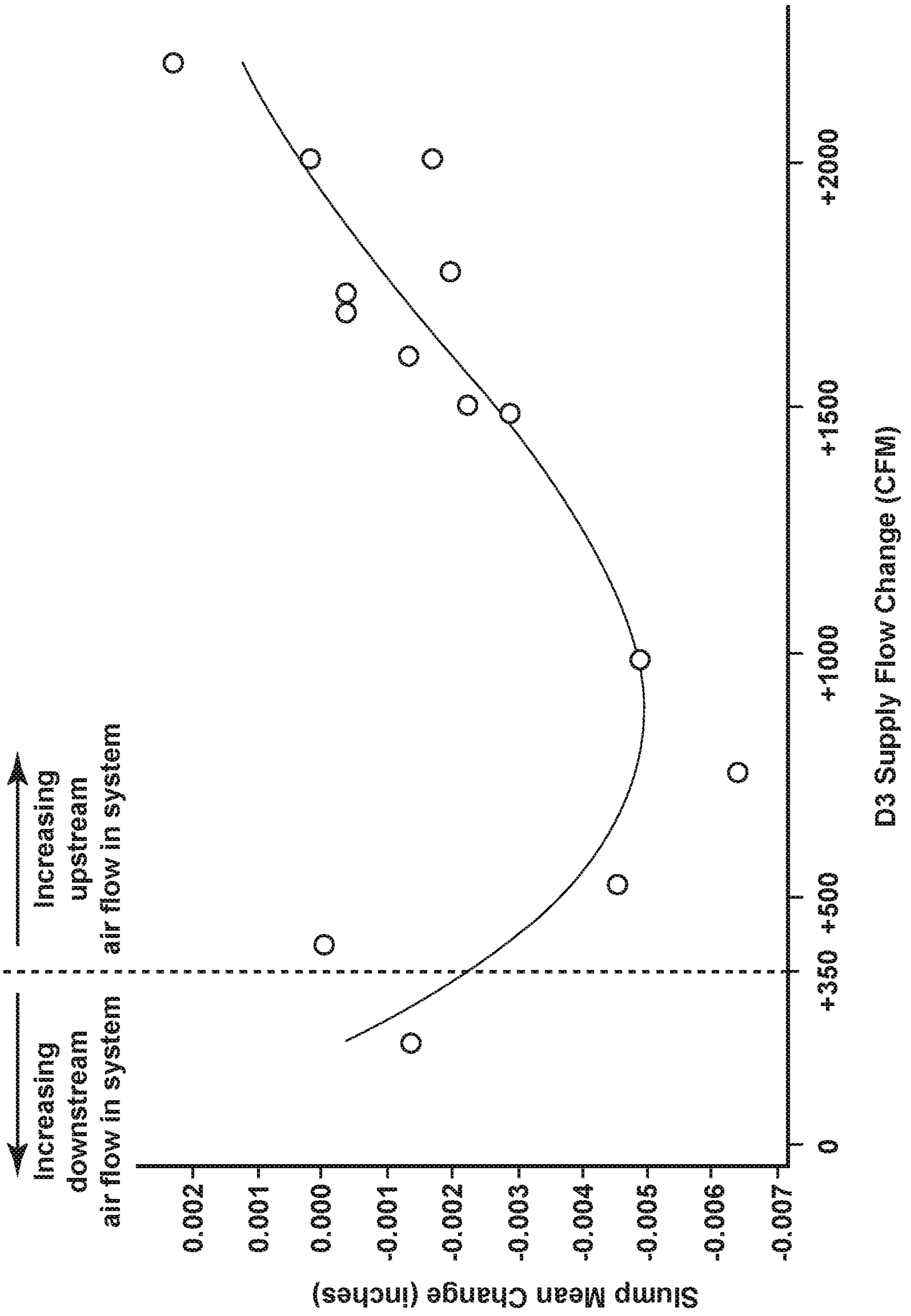
FIG. 5B is a plot of the mean change in the slump component of green ceramic honeycomb bodies as a function of supply air flow change in the last microwave device of a microwave drying system, as dried according to methods of the disclosure.

Referring now to FIG. 5A, a plot is provided of the mean change in the slide component (see FIGS. 3C and 3D) of green ceramic honeycomb bodies as a function of supply air flow change in the last microwave device of a microwave drying system (e.g., the microwave device D3 of drying system 50 depicted in FIG. 2), as dried according to the methods of this disclosure (e.g., the method 100 of drying green ceramic bodies 20 depicted in FIG. 4). It should also be understood that the green ceramic honeycomb bodies employed to develop the plot in FIG. 5A approximated an ideal shape with regard to the slide component (i.e., the slide component=0) prior to drying. As such, the data shown in FIG. 5A reflects a change to the slide component of these bodies upon drying. Similarly, as shown in FIG. 5B, a plot is provided of the mean change in the slump (see FIGS. 3A and 3B) component of green ceramic honeycomb bodies as a function of supply air flow change in the last microwave device of a microwave drying system, as dried according to methods of the disclosure. It should also be understood that the green ceramic honeycomb bodies employed to develop the plot in FIG. 5B exhibited a positive slump (i.e., as shown in FIG. 3A) with regard to the slump component prior to drying. As such, the data shown in FIG. 5B reflects a change to the slump component of these bodies upon drying.

FIGS. 5A and 5B demonstrate that the supply air flow in the last microwave device can be adjusted to change the overall flow and magnitude of the air in the system (e.g., microwave drying system 50) to effect changes to the slide and/or slump components of the green bodies. It is also believed that the effect of the adjustments to the supply air in the last microwave device on the overall system air flow direction and magnitude depicted in FIGS. 5A and 5B can also be achieved by similar changes to the exhaust air flow in the last microwave device. Similarly, it is also believed that the effect of the adjustments to the supply air in the last microwave device on the overall system air flow direction and magnitude depicted in FIGS. 5A and 5B can also be achieved by similar changes to the supply or exhaust air flow in any microwave device downstream from a first upstream microwave device in the system.

With regard to FIG. 5A, the data demonstrates that a linear relationship exists between a change in the slide component of the green bodies and the supply air flow change in the last microwave device (e.g., the microwave device D3 of the drying system 50, as shown in FIG. 2). As the supply air flow is increased in the supply air flow element in the last microwave device (e.g., through control of supply air flow element 76*c* in FIG. 2) while holding supply and exhaust air constant in the other devices, the overall air flow in the system trends toward the upstream direction (e.g., upstream direction 74). In addition, as the overall air flow in the system trends toward the upstream direction with an increasing magnitude, the drying of the green bodies reduces or otherwise counteracts a negative slide component associated with the ceramic green bodies. That is, a green body with a negative slide component (e.g., as sectioned from an extrudate prior to drying and depicted in FIG. 3C) is modified in the direction of having no slide component or a positive slide component (e.g., as shown in FIG. 3D). On the other hand, as the supply air flow is decreased in the supply air flow element in the last microwave device to negative values (e.g., through control of supply air flow element 76*c* in FIG. 2) while holding supply and exhaust air constant in the other devices, the overall air flow in the system trends toward the downstream direction (e.g., downstream direction 72). In addition, as the overall air flow in the system trends toward the downstream direction with an increasing magnitude, the drying of the green bodies tends to decrease the slide component of the ceramic green bodies. That is, a green body with a positive slide component (e.g., as sectioned from an extrudate prior to drying and depicted in FIG. 3D) is modified in the direction of having no slide component or a negative slide component (e.g., as shown in FIG. 3C). In sum, FIG. 5A demonstrates that adjustments to the supply flow in the last microwave device in a drying system can be employed to control the shape of the ceramic green bodies that results from a microwave drying process, as conducted according to the principles of the disclosure.

With regard to FIG. 5B, the data demonstrates that a parabolic relationship exists between a change in the slump component of the green bodies and the supply air flow in the last microwave device (e.g., the microwave device D3 of the drying system 50, as shown in FIG. 2). As the supply air flow is significantly increased or decreased in the supply air flow element in the last microwave device (e.g., through control of supply air flow element 76*c* in FIG. 2) while holding supply and exhaust air constant in the other devices, the overall air flow in the system trends toward the upstream or downstream direction with increasing magnitude (e.g., upstream direction 74 or downstream direction 72). In addition, as the overall air flow in the system trends toward the upstream or downstream direction with an increasing magnitude, the drying of the green bodies tends to have the effect of increasing the slump component of the ceramic green bodies. That is, a green body with a negative slump component (as shown in FIG. 3B), as sectioned from an extrudate prior to drying, experiences a positive change in its slump component upon drying (i.e., its shape changes from having a negative slump component toward having no slump or a positive slump component, as shown in FIG. 3A). On the other hand, it is also evident from FIG. 5B that adjusting the supply air flow in the last microwave device such that there is nearly no air flow in the system in either the upstream or downstream directions tends to cause greater reductions in the slump component of the green bodies. As such, green bodies with positive slump components (e.g., as shown in FIG. 3A), as sectioned from an extrudate prior to drying, can advantageously be adjusted by the drying processes of the disclosure to have no slump component or a less significant positive slump.

Referring again to the method 100 of drying a green ceramic body 20 depicted in FIG. 4, along with FIGS. 5A and 5B and their corresponding description above, embodiments of the method include employing the step 130 of flowing air against the outer peripheral wall 22 through control of one or more of supply air and exhaust air in one of the microwave devices (e.g., the last device, D3) such that the overall air flow in the microwave drying system 50 is at a predetermined magnitude of about 0 cfm. In such embodiments, step 130 of the method 100 is conducted such that overall flow of air in the system is not in either of the downstream or upstream directions 72 and 74, respectively. As is evident from FIGS. 5A and 5B, one or more of the supply air and exhaust air in the last microwave device can be controlled to reach an overall system air flow reflecting a "dividing line" between predominantly upstream or downstream air flow. Further, it is evident that such a system air flow (i.e., with a magnitude approaching 0 cfm) can substantially reduce a positive slump component in the green body and not alter its slide component (if any), as initially present in the green body upon sectioning from extrudate prior to drying.

According to another embodiment of the method 100 of drying a green ceramic body 20 depicted in FIG. 4, embodiments of the method include employing the step 130 of flowing air against the outer peripheral wall 22 through control of one or more of supply air and exhaust air in one of the microwave devices (e.g., the last device D3) such that the overall air flow in the microwave drying system 50 is at a predetermined magnitude greater than 0 cfm in the downstream direction 72. For example, as shown in FIGS. 5A and 5B, the supply air flow change in the last microwave device can be adjusted to be negative (e.g., as comparable to reducing an air flow set point of 2300 cfm to a lower air flow rate) to effect overall flow in the system 50 in the downstream direction 72. Further, it is evident that such a system air flow (i.e., with a magnitude >0 cfm in the downstream direction) can advantageously decrease the slide component of the green body while also increasing its slump component. For example, a green body with a positive slide component and a negative slump component, as initially present in the green body upon sectioning from extrudate prior to drying, can advantageously be adjusted during the drying process to minimize or remove its positive slide and negative slump components.

According to a further embodiment of the method 100 of drying a green ceramic body 20 depicted in FIG. 4, embodiments of the method include employing the step 130 of flowing air against the outer peripheral wall 22 through control of one or more of supply air and exhaust air in the last of the microwave devices downstream from the others (e.g., the last device D3) such that the supply air flow change in the last microwave device overall is at a predetermined magnitude from 0 cfm to +1000 cfm. For example, as shown in FIGS. 5A and 5B, the supply air flow change in the last microwave device can be adjusted in this fashion between 0 cfm and +1000 cfm (e.g., from an initial set point of 2300 cfm to a range between 2300 cfm and 3300 cfm) to minimize the magnitude of the overall air flow in the system in either of the downstream or upstream directions 72 and 74, respectively. As a result, it is evident that such a system air flow can advantageously increase the slide component of the green body while also increasing its slump component. For example, a green body with a negative slide component and a negative slump component, as initially present in the green body upon sectioning from extrudate prior to drying, can advantageously be adjusted during the drying process to minimize or remove its negative slide and slump components.

More generally, the methods (e.g., method 100 depicted in FIG. 4) and apparatus (e.g., the system 50 depicted in FIG. 2) for microwave drying of extruded green ceramic honeycomb bodies offer many advantages. These benefits include, but are not limited to, a capability of utilizing air flow apparatus that are employed in a conventional drying system to effect green body shape control. According to the principles of the disclosure, the overall air flow in the drying system can be adjusted to control green body shape changes during the drying process. The overall air flow in the system can also be employed to correct undesirable green body shapes that are present upon extrusion and sectioning prior to drying. Further, the apparatus and methods of the disclosure can be employed to: improve green body production selects (i.e., yield); reduce manufacturing downtime due to a reduced need for die changes associated green body shape variability associated with extrusion and drying; and improve overall green body quality, as judged by the presence of no slide and slump components, or slide and slump components with low magnitudes.

While exemplary embodiments and examples have been set forth for the purpose of illustration, the foregoing description is not intended in any way to limit the scope of the disclosure and appended claims. Accordingly, variations and modifications may be made to the above-described embodiments and examples without departing substantially from the spirit and various principles of the disclosure. For example, the principles of the disclosure could be applied in an alternative microwave drying system (e.g., as compared to the system 50 depicted in FIG. 2) for ceramic green bodies in which the microwave devices (e.g., D1, D2, D3, etc.) are isolated from one another in terms of air flow, and adjustments to air flow within each of the devices are made to effect shape change to the green bodies during the drying process. All such modifications and variations are intended to be included herein within the scope of this disclosure and protected by the following claims.

What is claimed is:

1. A method of drying a green ceramic honeycomb body comprising a matrix of walls extending parallel to a longitudinal axis and defining a plurality of longitudinal channels, the matrix being surrounded by an outer peripheral wall, the method comprising:

moving the honeycomb body through a drying system comprising a plurality of interconnected microwave devices in a travel path such that the longitudinal axis of the body is non-parallel to the travel path inside the microwave devices, wherein each microwave device comprises an entrance located at an upstream end of the device and an exit located at a downstream end of the microwave device, the upstream and downstream ends of the devices defining a downstream direction and an upstream direction in each of the devices and the system;

removing moisture from the honeycomb body by irradiating the honeycomb body with microwave radiation within each of the microwave devices; and flowing air against the outer peripheral wall of the honeycomb body while the honeycomb body is located in each of the microwave devices, wherein the flowing is conducted such that one or more of a supply flow and an exhaust flow of air is adjusted in at least one of the microwave devices such that the air flow in the system is at a predetermined magnitude substantially in the upstream direction or the downstream direction.

2. The method according to claim 1, wherein the flowing is conducted such that the air flow in the system is at a predetermined magnitude of about 0 cfm.

3. The method according to claim 1, wherein the flowing is conducted such that the air flow in the system is at a predetermined magnitude of greater than 0 cfm in the upstream or downstream direction.

4. The method according to claim 1, wherein the flowing is further conducted to change a shape of the outer peripheral wall of the honeycomb body within at least one of the microwave devices.

5. The method according to claim 1, wherein the flowing is conducted such that one or more of a supply flow and an exhaust flow of air is adjusted in one of the microwave devices to change a shape of the outer peripheral wall of the honeycomb body within another of the microwave devices.

6. The method according to claim 1, wherein the flowing is conducted such that a supply flow of air is adjusted in one of the microwave devices downstream from the first microwave device with a change in flow rate such that the air flow in the system is at a predetermined magnitude substantially in the upstream or downstream direction.

7. The method according to claim 1, wherein the flowing is conducted such that a supply flow of air is adjusted in the last of the microwave devices downstream from the other devices with a change in flow rate such that the air flow in the system is at a predetermined magnitude substantially in the upstream or downstream direction.

8. The method according to claim 1, wherein the moving, removing and flowing air steps are further conducted with the honeycomb body residing in a ceramic carrier.

9. A method of drying a green ceramic honeycomb body comprising a matrix of walls extending parallel to a longitudinal axis and defining a plurality of longitudinal channels, the matrix being surrounded by an outer peripheral wall, the method comprising:

moving the honeycomb body through a drying system comprising a plurality of interconnected microwave devices in a travel path such that the longitudinal axis of the body is non-parallel to the travel path inside the microwave devices, wherein each microwave device comprises an entrance located at an upstream end of the device and an exit located at a downstream end of the microwave device, the upstream and downstream ends of the devices defining a downstream direction and an upstream direction in each of the devices and the system;

removing moisture from the honeycomb body by irradiating the honeycomb body with microwave radiation within each of the microwave devices; and flowing air against the outer peripheral wall of the honeycomb body while the honeycomb body is located in each of the microwave devices, wherein a shape of the peripheral wall of the honeycomb body comprises one or more of a slide component and a slump component, and wherein the flowing is conducted such that one or more of a supply flow and an exhaust flow of air is adjusted in at least one of the microwave devices such that the air flow in the system is at a predetermined magnitude substantially in the upstream direction or the downstream direction.

10. The method according to claim 9, wherein the flowing is conducted such that the air flow in the system is at a predetermined magnitude of about 0 cfm.

11. The method according to claim 9, wherein the flowing is conducted such that the air flow in the system is at a predetermined magnitude of greater than 0 cfm in the upstream or downstream direction.

12. The method according to claim 9, wherein the flowing is further conducted to reduce the magnitude of one or more of the slide component and the slump component of the peripheral wall of the honeycomb body within at least one of the microwave devices.

13. The method according to claim 9, wherein the flowing is conducted such that one or more of a supply flow and an exhaust flow of air is adjusted in one of the microwave devices to reduce the magnitude of one or more of the slide component and the slump component of the peripheral wall of the honeycomb body within another of the microwave devices.

14. The method according to claim 9, wherein the flowing is conducted such that a supply flow of air is adjusted in one of the microwave devices downstream from the first microwave device with a change in flow rate such that the air flow in the system is at a predetermined magnitude substantially in the upstream or downstream direction.

15. The method according to claim 9, wherein the flowing is conducted such that a supply flow of air is adjusted in the last of the microwave devices downstream from the other devices with a change in flow rate such that the air flow in the system is at a predetermined magnitude substantially in the upstream or downstream direction.

16. The method according to claim 15, wherein the shape of the peripheral wall of the honeycomb body comprises a slump component, and wherein the flowing is further conducted to reduce the magnitude of the slump component of the peripheral wall of the honeycomb body within at least one of the microwave devices.

17. The method according to claim 16, wherein the flowing is further conducted such that a supply flow of air is adjusted in the last of the microwave devices downstream of the other devices.

18. The method according to claim 9, wherein the moving, removing and flowing air steps are further conducted with the honeycomb body residing in a ceramic carrier.

* * * * *